No. 775,636.

Patented November 22, 1904.

UNITED STATES PATENT OFFICE.

LOUIS C. RUGEN, OF BOUNDBROOK, NEW JERSEY, AND HERBERT ABRAHAM, OF NEW YORK, N. Y., ASSIGNORS TO THE STANDARD PAINT COMPANY, OF BOUNDBROOK, NEW JERSEY, A CORPORATION OF WEST VIRGINIA.

WEATHERPROOF COVERING.

SPECIFICATION forming part of Letters Patent No. 775,636, dated November 22, 1904.

Application filed May 27, 1904. Serial No. 210,059. (No specimens.)

*To all whom it may concern:*

Be it known that we, LOUIS C. RUGEN, a resident of Boundbrook, county of Somerset, and State of New Jersey, and HERBERT ABRAHAM, a resident of the borough of Manhattan, city, county, and State of New York, citizens of the United States, have invented certain new and useful Improvements in Weatherproof Coverings, of which the following is a specification.

Our invention relates to weatherproof coverings such as are used in buildings for roofing, sheathing, and like purposes.

The object of our invention is to provide certain improvements in the manufacture of such coverings whereby colored coverings may be readily produced.

The incorporation of pigments has presented great difficulties; but we succeeded at last in overcoming them, particularly in the manufacture of coverings containing bitumen and pitches showing a black color when examined in thin layers. There is, however, another class of bitumens and pitches which exhibit a brownish color when examined in thin layers. When such bitumens or pitches (in a molten or plastic condition) are mixed or otherwise united with a pigment, as will be described in detail hereinafter, they will at first assume the color of the pigment only to a limited extent. In fact, in some cases the product will appear almost perfectly black. We have observed that on exposure to the atmosphere the color of the pigment will gradually become visible and will increase in distinctness until a maximum is reached—say after a period of two months. This phenomenon is probably due to the fact that originally each particle of pigment is covered with a thin film of the pitch or bitumen, which masks the color of the pigment. As this film is gradually destroyed by oxidation the particles of pigment are uncovered, as it were, until finally the color of the pigment predominates.

It would obviously be a drawback commercially if the product above referred to had to be stored and exposed to atmospheric influences in the factory until the final permanent color or tint was obtained. On the other hand, the sale of a covering originally black or nearly black and gradually acquiring a different color in, say, two months would meet with obvious difficulties. We have therefore devised a treatment which enables us to give the product from the very moment it is finished the permanent color which the pigment imparts to it after sufficient exposure to the atmosphere. This treatment is also applicable to other substances which have the property of changing their color or tint under atmospheric influences.

We will now describe in detail one particular way of making our improved covering and will then point out the novel features of our invention in the appended claims.

We take as a foundation paper, felt, or the like saturated or coated with asphaltum, tar, or pitch or both saturated and coated therewith. The permanent facing consists of a carrier and a pigment. The carrier contains one or more pitches of the brownish kind hereinbefore mentioned. Most pitches of animal and vegetable origin belong to this class—that is, those derived from fats and oils. Some mineral pitches—as, for instance, Egyptian asphaltum—also have this characteristic. The carrier is (in a molten or half-molten plastic condition) mixed with a pigment, preferably a metallic oxid pigment, although other weatherproof pigments may be employed. This permanent facing is preferably applied while the foundation is in a heated or plastic condition.

In detail, to produce a yellow covering we may proceed as follows: Three parts, by weight, of stearin pitch or its equivalent and two parts, by weight, of polymerized oil (for instance, linseed-oil) are melted together, and when the mixture is homogeneous eight parts, by weight, of yellow ocher are stirred in. The resulting mixture is applied to the fabric in any approved manner, and the facing thus obtained is coated while in a semiplastic condition with a powder consisting of ten parts, by weight, of yellow ocher and ninety parts, by weight, of pulverized soapstone.

As has been stated hereinbefore, the permanent facing does not immediately upon its application to the foundation clearly exhibit the color of the pigment. In many cases the color of the pigment is scarcely discernible at first. When, however, the product is exposed to atmospheric influences, the color of the pigment will gradually appear and will become more and more pronounced until after a certain time, depending upon weather conditions, a maximum of intensity is reached, after which the appearance of the material will remain unchanged. Thus the product may at first appear almost perfectly black, but will gradually turn dark brown, light brown, and finally yellowish. In order to be able to market the product immediately upon its completion, notwithstanding the change of color it undergoes by exposure to the air, we apply to the material a temporary facing, which as a rule will correspond in color as nearly as possible to the ultimate color of the permanent facing and having the property of gradually disappearing under atmospheric influences. This vanishing of the temporary facing may take place so as to correspond to the gradual increase or development of the color of the permanent facing, so that notwithstanding the changes above spoken of the appearance of the material will always be the same.

The temporary facing consists of a colored powder, which we apply to the permanent facing, preferably while the latter is in a semi-molten or plastic condition. Some of the powder will adhere to the fabric, and the excess may be largely removed by brushes or cloth scrapers. The powder may be simply in the form of a pigment without any admixture, this being the procedure employed when a very intense color is desired. As a rule, however, it will suffice and be preferable to mix pulverized soapstone with five to ten per cent. of a high-grade pigment or to grind the soapstone with the pigment. Usually the same pigment is incorporated with the soapstone as is used in the permanent facing.

The behavior of a fabric provided with a temporary facing of the character above described is as follows: When the fabric has been placed out of doors, so as to be exposed to rain and other atmospheric influences, a large quantity of the powder is either blown away or washed off in a very short while; but that portion which has become attached to the facing while the latter was plastic adheres tenaciously. During this interval of time the permanent facing has undergone alteration, in that the color of the pigment contained in the said permanent facing has gradually become more and more pronounced. When the permanent facing has reached its maximum of color intensity, the temporary facing has disappeared, or at least ceased to change noticeably, and in this manner the article is given a permanent appearance or color from the very moment it is finished. As hereinbefore stated, the gradual development or appearance of the pigment may be explained as due to a partial destruction of the pitch or bitumen by oxidation, although other explanations might be advanced.

The temporary facing hereinbefore described not only supplies the temporary deficiency in color until the pigment combined with the facing has had an opportunity to become more intense or to develop, as it were, but in addition to this the powder prevents the material from sticking together when wound up.

Various modifications may be made without departing from the nature of our invention.

We claim as our invention—

1. The herein-described process of manufacturing weatherproof covering materials, which consists in applying to a suitable foundation a permanent facing containing a pigment adapted to be made apparent, or to be developed, by exposure to atmospheric influences, and applying to said facing a temporary facing of about the same color as the ultimate color of the permanent facing, said temporary facing being adapted to be removed by atmospheric influences.

2. The herein-described process of producing weatherproof coverings which consists in applying to a suitable foundation a permanent facing containing a pigment which is adapted to be developed by atmospheric influences, and applying to said permanent facing, while it is in a plastic condition, a powdered temporary facing of about the same color as the ultimate color of the permanent facing, said temporary facing being adapted to be removed by atmospheric influences.

3. The herein-described process of producing weatherproof coverings which consists in applying to a suitable foundation a permanent facing containing a pitch or bitumen of a brownish color when examined in a thin layer, and also containing a pigment adapted to become plainly visible or to be developed by exposure to atmospheric influences, and applying to the said permanent facing a temporary facing of about the same color as the final color of the permanent facing, said temporary facing being adapted to be removed upon exposure to the atmosphere.

4. The herein-described process of producing weatherproof coverings which consists in applying to a suitable foundation a facing containing a bitumen or pitch exhibiting a brownish color when viewed in a thin layer, said facing also containing a pigment adapted to become clearly visible or to develop upon exposure to the atmosphere.

5. The herein-described process of manufacturing weatherproof covering materials, which consists in applying to a suitable foundation, a permanent facing containing a pigment adapted to be made apparent, or to be developed, by exposure to atmospheric influences, and applying to said permanent facing a temporary facing adapted to be removed by atmospheric influences.

6. The herein-described process of manufacturing weatherproof covering materials, which consists in applying to a suitable foundation, a permanent facing containing a pitch or bitumen of a brownish color when examined in a thin layer, and also containing a pigment adapted to be made apparent, or to be developed, by exposure to atmospheric influences, and applying to said permanent facing a temporary facing adapted to be removed by atmospheric influences.

7. As a new article of manufacture, a weatherproof material, the same comprising a foundation, a permanent facing containing a pigment adapted to be developed upon exposure to the atmosphere and a temporary facing of about the same color as the final color of the permanent facing, the said temporary facing being adapted to be removed by atmospheric influences.

8. As a new article of manufacture, a weatherproof material, the same comprising a foundation, a permanent facing which comprises a pitch or bitumen of a brownish color when viewed in a thin layer and a pigment adapted to be developed by atmospheric influences, and a temporary facing of the same color as the final color of the permanent facing and adapted to be removed by atmospheric influences.

9. As a new article of manufacture, a weatherproof material, the same comprising a foundation and a facing which comprises a pitch or bitumen of a brownish color when viewed in a thin layer and a pigment adapted to be developed by atmospheric influences.

10. As a new article of manufacture, a weatherproof material, the same comprising a foundation, a permanent facing which comprises a pitch or bitumen of a brownish color when viewed in a thin layer and a pigment adapted to be developed by atmospheric influences, and a temporary facing of the same color as the final color of the permanent facing and adapted to be removed by atmospheric influences, the said temporary facing consisting of soapstone and a pigment.

11. As a new article of manufacture, a weatherproof material, the same comprising a foundation and a facing containing a pigment and a body consisting of a pitch or bitumen of a brownish color when viewed in a thin layer.

In testimony whereof we have hereunto signed our names in the presence of two subscribing witnesses.

LOUIS C. RUGEN.
HERBERT ABRAHAM.

Witnesses:
JOHN LOTKA,
JOHN A. KEHLENBECK.